Dec. 24, 1957 A. H. SIEVERS ET AL 2,817,203
EARTH LEVELER AND DRAFT CONNECTION THEREFOR
Filed Oct. 9, 1953
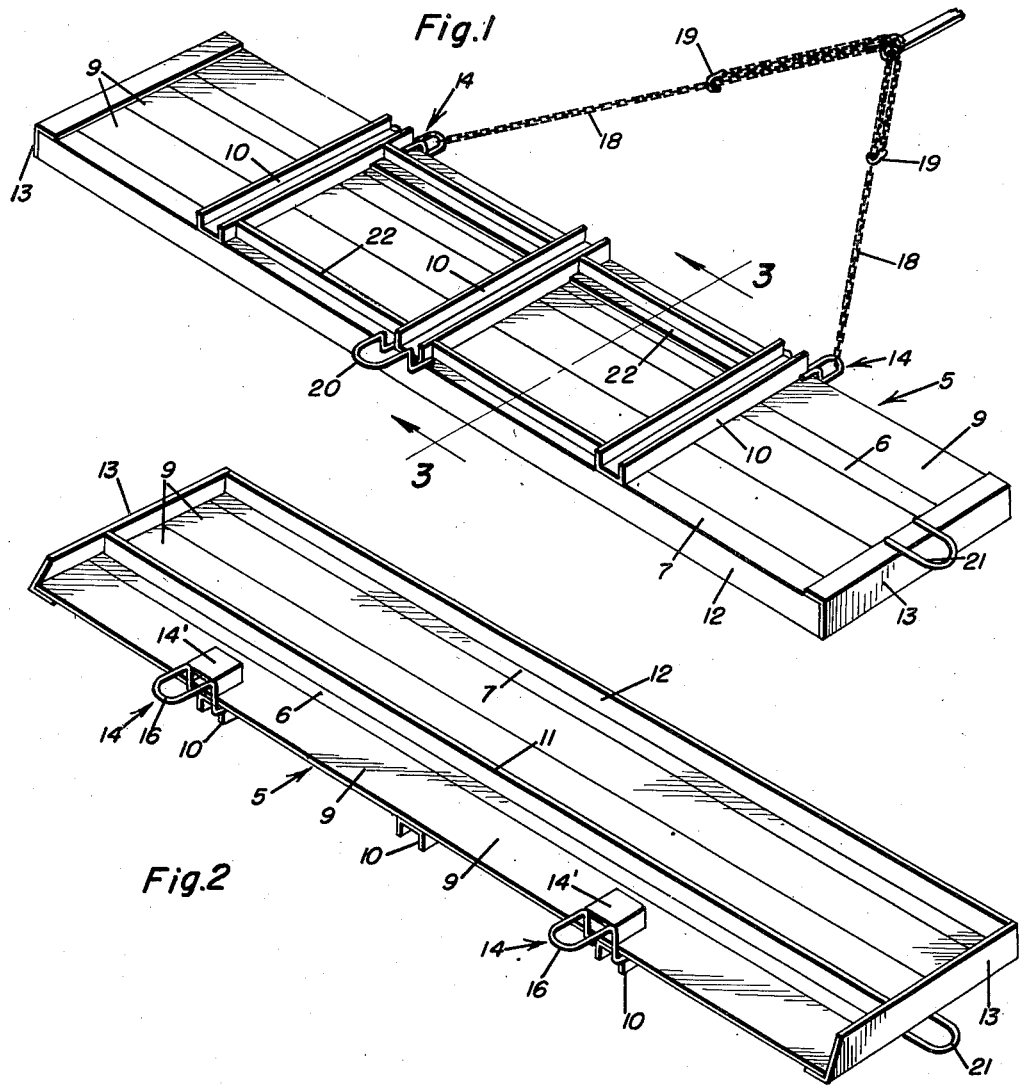
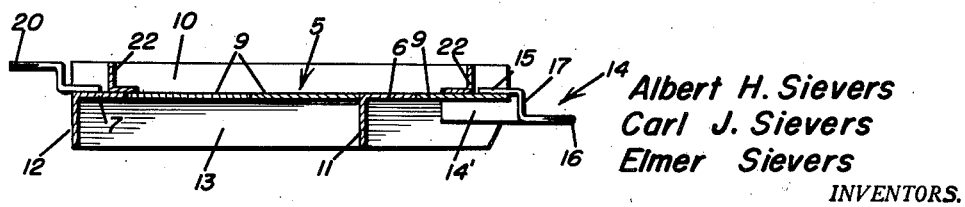
Albert H. Sievers
Carl J. Sievers
Elmer Sievers
INVENTORS.
BY *Clarence A. O'Brien*
*and Harvey B. Jacobson*
Attorneys

United States Patent Office 2,817,203
Patented Dec. 24, 1957

2,817,203

EARTH LEVELER AND DRAFT CONNECTION THEREFOR

Albert H. Sievers, Carl J. Sievers, and Elmer Sievers, Fieldon, Ill.

Application October 9, 1953, Serial No. 385,102

1 Claim. (Cl. 55—22)

The present invention relates to new and useful improvements in earth levelers of the drag type for use particularly on plowed fields and has for its primary object to provide, in a manner hereinafter set forth, an agricultural implement of this character comprising a novel construction and arrangement of parts whereby the device may be successfully used for smoothing down either fine, loose or hard, lumpy soil to hold moisture for better discing, also to seal the soil to retain the moisture after the seed has sprouted.

Another very important object of the invention is to provide a drag type soil leveler of the aforementioned character comprising novel means for hitching the implement to a tractor or other source of power.

Other objects of the invention are to provide an earth or soil leveling device of the character set forth which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top perspective view of an earth leveler constructed in accordance with the present invention;

Figure 2 is a bottom perspective view of the improved implement; and

Figure 3 is a sectional view, taken substantially on the line 3—3 of Figure 1.

Referring now to the drawing in detail, it will be seen that the embodiment of the present invention which has been illustrated comprises a transversely elongated platform of suitable metal which is designated generally by reference character 5. The platform 5 also may be of any desired dimensions.

The platform 5 includes a pair of spaced, parallel transversely extending front and rear angle irons 6 and 7, respectively, between and forwardly of which metallic plates 9 are mounted. A plurality of spaced, parallel, longitudinal channel bars 10 are welded on the members 6, 7 and 9 at intermediate points.

The vertical legs of the angle irons 6 and 7 provide, respectively, blades 11 and 12 which depend from the platform 5. Welded on the ends of the platform 5 are depending clod and soil retaining flanges 13 which are also in the form of angle irons.

Longitudinal shoes or brackets 14' in the form of channel irons are welded to the underside of the front plate or apron 9 flush with the forward edge thereof and beneath the outermost channel bars 10. Mounted on the front of the platform 5 are substantially U-shaped hitches 14. The free end portions of the legs 15 of the hitches 14 straddle the outermost channel bars 10 and are welded thereto and to the plate 9. The hitches 14 further include downwardly offset bight portions 16 providing vertical intermediate leg portions 17 which are welded to the forward ends of the flanges of the shoes or brackets 14'. Draft chains 18, for connection with a tractor, have one end loosely connected to the hitches 14. The other end portions of the draft chains 18 are lapped and adjustably connected through the medium of suitable hooks 19. Mounted on the rear portion of the platform 5 and projecting rearwardly therefrom is an upwardly offset hitch 20 which is similar to the hitches 14 and which straddles the intermediate channel bar 10. Mounted on one of the members 13 is a substantially U-shaped laterally extending hitch 21.

It is thought that the operation of the device will be readily apparent from a consideration of the foregoing. Briefly, as the implement is drawn forwardly, the soil is thoroughly smoothed and leveled by the blades 11 and 12. The plates 9 prevent the soil from passing upwardly through the platform 5, cause the implement to float and prevent the blades 11 and 12 from being overloaded. To eliminate clods and hard, lumpy soil, the implement may be weighted and towards this end, weight retaining bars 22 are welded on the platform 5 and extended between the channel bars 10. The downwardly offset front hitches 14 maintain the implement in a horizontal plane for ensuring uniform action of the blades 11 and 12. The hitch 20 facilitates the attachment of a harrow or other implement behind the lever. The retaining flanges 13 prevent clods or soil from rolling out the sides or ends of the implement and leading ridges. The single hitch 21 on one end of the platform 5 facilitates moving the implement from field to field, through gateways, etc.

It is believed that the many advantages of an improved earth leveler constructed in accordance with the present invention will be readily understood and although a preferred embodiment of the implement is as illustrated and described, it is to be understood that changes in the details of construction may be resorted to which will fall within the scope of the invention as claimed.

What is claimed is:

An earth leveling implement including a flat, transversely elongated metallic platform, blades mounted transversely beneath said platform, spaced parallel channel bars mounted on the platform and terminating flush with the front edge thereof, substantially U-shaped ground engaging shoes mounted longitudinally on the underside of the platform beneath the channel bars and flush with said forward edge of said platform, and substantially U-shaped horizontal hitches having their end portions straddling the channel bars and affixed thereto and to the top of the platform, said hitches comprising vertical intermediate leg portions affixed to the forward ends of the flanges of the shoes and further comprising downwardly offset bight portions extending forwardly of the bight portions of said shoes.

References Cited in the file of this patent

UNITED STATES PATENTS

| | | |
|---|---|---|
| 897,310 | Silvadie | Sept. 1, 1908 |
| 1,064,585 | Yoder | June 10, 1913 |
| 1,082,552 | Pinet | Dec. 30, 1913 |
| 1,365,287 | Smidley | Jan. 11, 1921 |
| 1,428,880 | Demott | Sept. 12, 1922 |
| 1,445,506 | Gorhy | Feb. 13, 1923 |
| 1,779,548 | Lage | Oct. 28, 1930 |
| 2,085,645 | Fish | June 29, 1937 |